United States Patent [19]

Hassell

[11] Patent Number: 5,346,357
[45] Date of Patent: Sep. 13, 1994

[54] SELF-LOCKING PARALLEL-MOTION DOLLY MOUNT

[76] Inventor: Curtis C. Hassell, 791 Highway 238, Jacksonville, Oreg. 97530

[21] Appl. No.: 18,140

[22] Filed: Feb. 16, 1993

Related U.S. Application Data

[62] Division of Ser. No. 756,696, Sep. 6, 1991, Pat. No. 5,209,628.

[51] Int. Cl.⁵ ................................................ B60R 9/00
[52] U.S. Cl. .................................... 414/462; 224/315
[58] Field of Search ............. 224/42.21, 42.28, 42.32, 224/42.44, 42.45 R, 290, 282, 315; 414/546, 555, 556, 557, 563, 462, 463, 466, 913, 917, 743, 465

[56] References Cited

U.S. PATENT DOCUMENTS 4,685,860  8/1987  McFarland ........................ 414/720
4,780,044 10/1988  Elskamp ........................ 414/917 X
4,808,056  2/1989  Oshima ............................... 414/462

Primary Examiner—Michael S. Huppert
Assistant Examiner—Janice Krizek
Attorney, Agent, or Firm—Henderson & Sturm

[57] ABSTRACT

An apparatus for stowing or extending for loading and unloading a towing dolly. The invention comprises a vertical support stand upon which rotate a pair of spaced apart pivot arms connected to a bracket into which is placed the towing dolly. The apparatus utilizes a novel self-locking flange which rotates so as to secure the dolly within the mounting bracket when it is pivoted into the storage position, and rotates so as to release the dolly from the bracket when the device is pivoted into the load/unload position. The apparatus may be secured into the storage position by means of a spring operated latch arm and latch pin. Further, the invention provides a locking lug for locking the towing dolly into the dolly mount to prevent theft of the towing dolly.

4 Claims, 2 Drawing Sheets

SELF-LOCKING PARALLEL-MOTION DOLLY MOUNT

This application is a division of application Ser. No. 07/756,696, filed Sept. 9, 1991, now U.S. Pat. No. 5,209,628.

TECHNICAL FIELD

This invention relates to towing dolly mount devices, and more particularly to a parallel-motion towing dolly mount device which automatically secures the towing dolly to the apparatus when it is moved into the stored position.

BACKGROUND ART

When a motor vehicle becomes disabled due to an accident or mechanical failure it is often necessary to tow the disabled vehicle to a repair facility. Likewise, it is often necessary to tow vehicles of parking violators to vehicle detention lots. In all of these cases, dollies are sometimes used in order to prevent damage to the vehicles being towed.

In a towing operation, a pair of towing dollies are placed on opposite sides and under the vehicle to be towed. These dollies allow a vehicle to be safely towed where rotation of a vehicle's wheels is impractical or impossible due to possible vehicle damage or the like.

Towing dollies are heavy and cumbersome. These characteristics make the towing dollies difficult to load and unload onto or from a tow truck bed. The prior art teaches the use of a pair of storage brackets mounted onto either side of a conventional tow truck bed. In practice, a tow truck operator is required to climb on top of the truck bed, lift a towing dolly from its bracket, and then climb down out of the bed carrying the heavy dolly. After placing the dolly in position, the operator must then climb back into the bed to carry the remaining dolly down out of the bed.

The reverse of the before described operation is required in order to return the dollies to their storage brackets. Many tow truck operators have sustained back injuries and the like while handling dollies in this manner.

Those concerned with these and other problems recognize the need for a self-loading dolly mount apparatus capable of extendably securing a towing dolly over the truck bed of a conventional towing vehicle.

DISCLOSURE OF THE INVENTION

The present invention describes a novel apparatus for rotatably extending a dolly from a conventional tow truck bed. This is accomplished by providing a generally vertical support stand secured within the bed of a conventional tow truck. Securement means for securing a towing dolly is pivotally and rotatably connected to the vertical support stand by a pair of generally parallel arms pivotally connected in spaced apart relation between the generally vertical support stand and the securement means such that a parallelogram linkage is formed. Pivotally connected between the dolly securement means and vertical support stand is a hydraulic spring for facilitating pivotable rotation. Fixed to the upper end of one of the linkages is a flange which rotates between the vertical and the horizontal positions during loading/unloading and which serves to automatically secure the towing dolly to the dolly mount. A handle is also connected to the dolly mount such that an operator may easily operate the apparatus by grasping and pulling or pushing on the handle.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
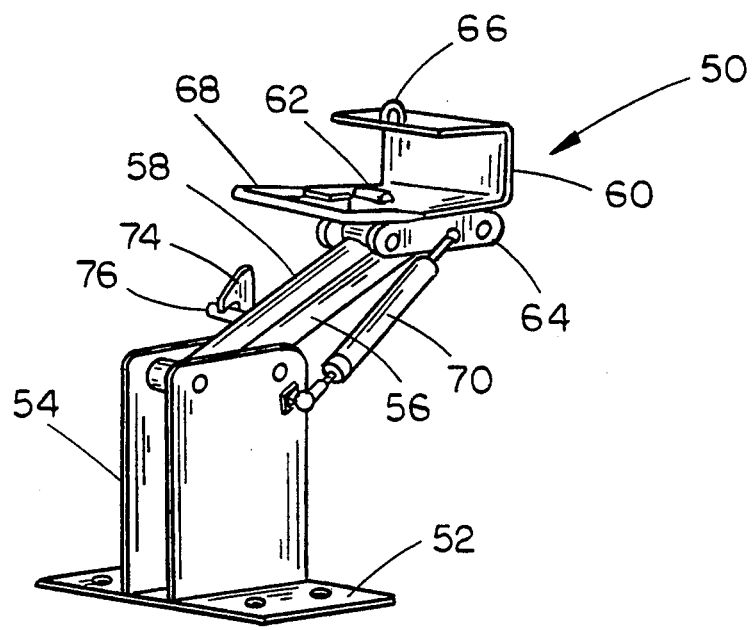
FIG. 1 is a perspective view of the invention showing the apparatus in the storage position.
Figures 2, 3:
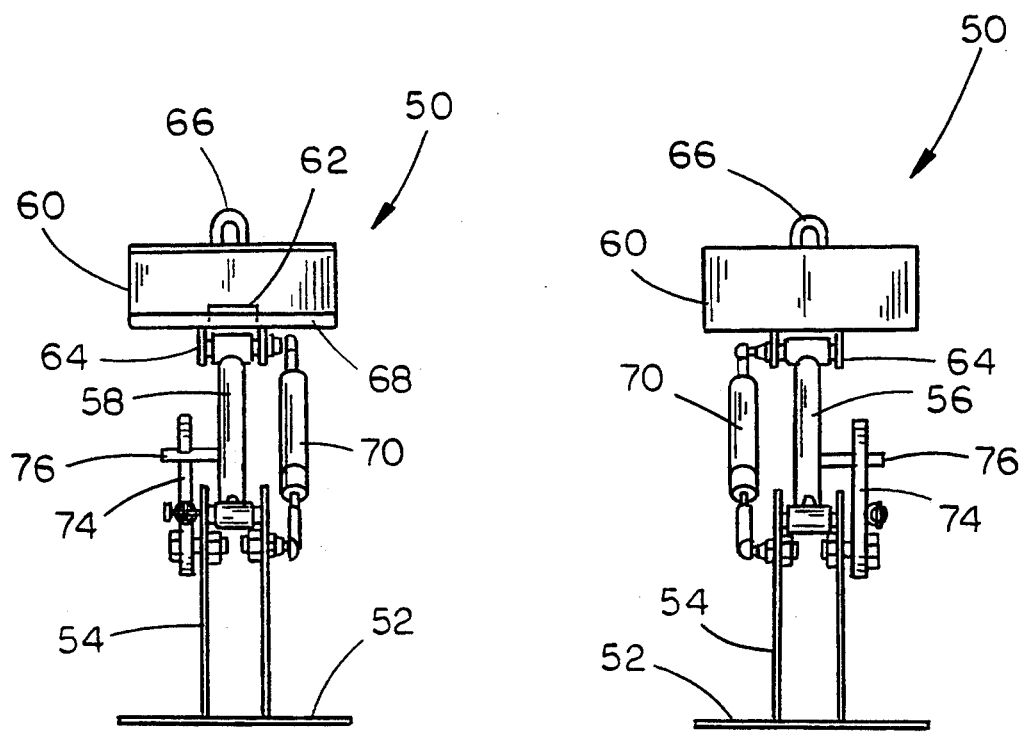
FIG. 2 is a front elevation view of the invention illustrating the components of the apparatus.
FIG. 3 is a rear elevation view of the invention illustrating the components of the apparatus.
Figure 4:
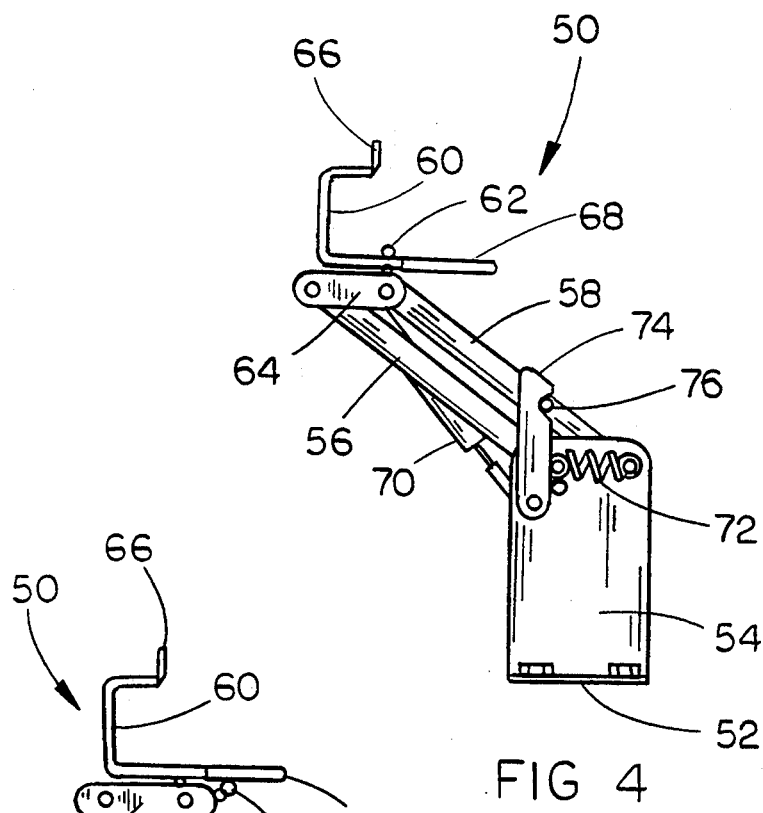
FIG. 4 is a side elevation view of the invention in the locked storage position.
Figure 6:
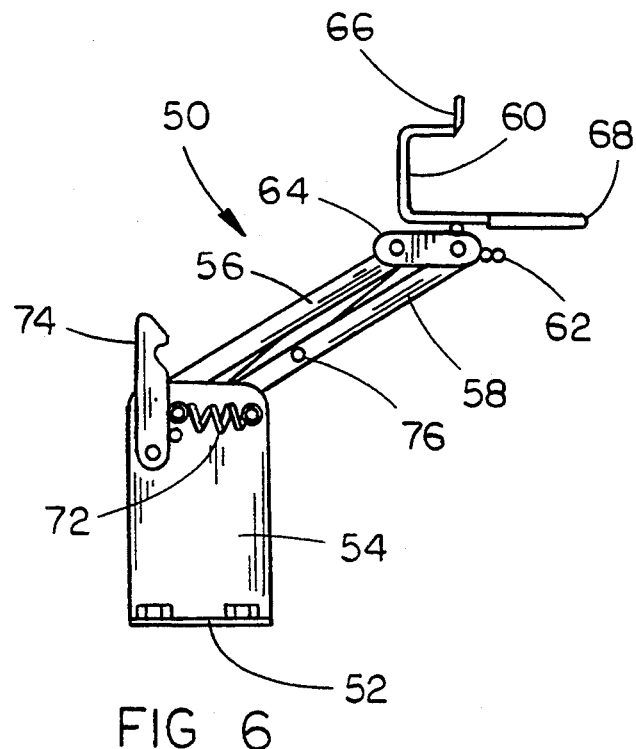
FIG. 6 is a side elevation view of the invention extended to the unloading or loading position.

Referring now to the drawings, wherein like reference numerals designate identical or corresponding parts throughout the several views, a preferred embodiment of the invention 50 is shown most clearly in the stowed position in FIG. 1 and FIG. 4 and in the load-/unload position in FIG. 6. A base support plate 52 is secured to the bed of the tow truck, and to this plate 52 is secured a pair of vertical support members 54 in a spaced apart relationship to each other. Rotatably attached to the upper ends of the vertical support members is a first pivot arm 56 and a second pivot arm 58, which in turn are rotatably attached to a U-shaped dolly mounting bracket 60 by means of shackle straps 64.

Also pivotally connected between the vertical support members 54 and the shackle straps 64 is a hydraulic spring 70, which is pressurized to approximately 120 psi. Also shown is a latch arm 74, which latches over a latch pin 76 when the invention is moved to the storage position, and is held securely in place by means of latch spring 72.

A self-lock flange 62 is fixed to the upper end of the second pivot arm 58 such that the self-lock flange extends upwardly in a vertical direction when the apparatus is in the stowed position, and extends outwardly in a horizontal direction when the apparatus is in the load-/unload position. In the stowed position of the apparatus, the self-lock flange protrudes upward through an aperture in the mounting bracket 60 so as to lock the towing dolly within the bracket 60.

Also shown is a handle 68 for use by the operator when rotating the invention between the stowed and load/unload position. A U-shaped locking lug 66 is welded to the mounting bracket and may be used to deter theft by locking the towing dolly to the mounting bracket by passing a padlock through the lug 66 and a similar lug which has been welded to the towing dolly.

Figure 5:
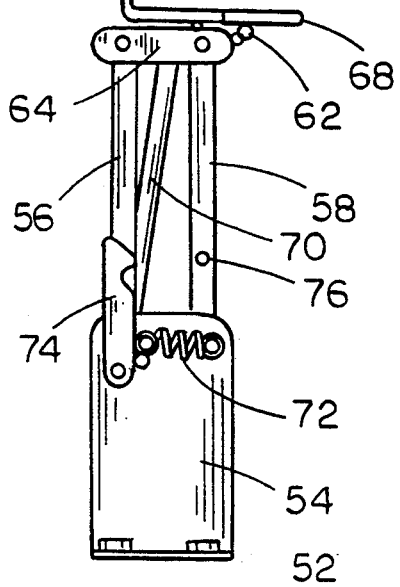
FIG. 5 is a side elevation view of the invention being extended to an unloading or loading position.

In operation, therefore, the invention will be positioned to the load position, where a towing dolly will be placed within the mounting bracket 60. The operator will then grasp the handle 68 and rotate the invention into the storage position where the latch pin 76 will be engaged by the latch arm 74. As the apparatus is rotated to the storage position, self-lock flange 62 rotates upward through an aperture in the bracket 60 where it engages the dolly and locks it into a secure position for transportation. For unloading, the operator simply pulls the handle 68 after releasing the latch arm 74 (held by latch spring 72) from the latch pin 76. The hydraulic spring 70 facilitates movement to the load/unload position by lifting the dolly. At the position illustrated in FIG. 4, the spring 70 is fully compressed. In FIG. 5, the spring 70 is decompressing and the weight of the towing dolly then forces the apparatus to the load/unload position of FIG. 6. In this position, an operator may safely remove the dolly for towing.

Obviously, many modifications and variations of the present invention are possible in light of the above teachings. It is therefore to be understood that, within the scope of the appended claims, the invention may be practiced otherwise than as specifically described.

What is claimed is:

1. A self-locking dolly mount apparatus for storing and removably extending a towing dolly, comprising:
    (a) a generally vertical support stand;
    (b) a first pivot arm and a second pivot arm, each having a lower end and an upper end, and each pivotally attached at its lower end to said support stand, said first and second pivot arms pivoting between a stowed position and a load/unload position;
    (c) a dolly mount bracket pivotally attached to the upper ends of said first and second pivot arms, said dolly mount bracket having an aperture; and
    (d) a self-lock flange secured to the upper end of said second pivot arm wherein said self-lock flange pivots to a position in which the flange extends through the aperture so as to secure a towing dolly within said dolly mount bracket when said first and second pivot arms are in the stowed position and wherein said self-lock flange pivots to a position so as to release a towing dolly from within said dolly mount bracket when said first and second pivot arms are in the load/unload position.

2. A self-locking dolly mount apparatus as recited in claim 1, further comprising a hydraulic spring having a first end and a second end, said first end pivotally attached to said support stand and said second end pivotally attached to said dolly mount bracket.

3. A self-locking dolly mount apparatus as recited in claim 1, further comprising a latching means for securing the first and second pivot arms in the stowed position.

4. A self-locking dolly mount apparatus as recited in claim 1, further comprising means for locking a towing dolly to the dolly mount apparatus to prevent theft of the towing dolly.

* * * * *